Patented May 30, 1939

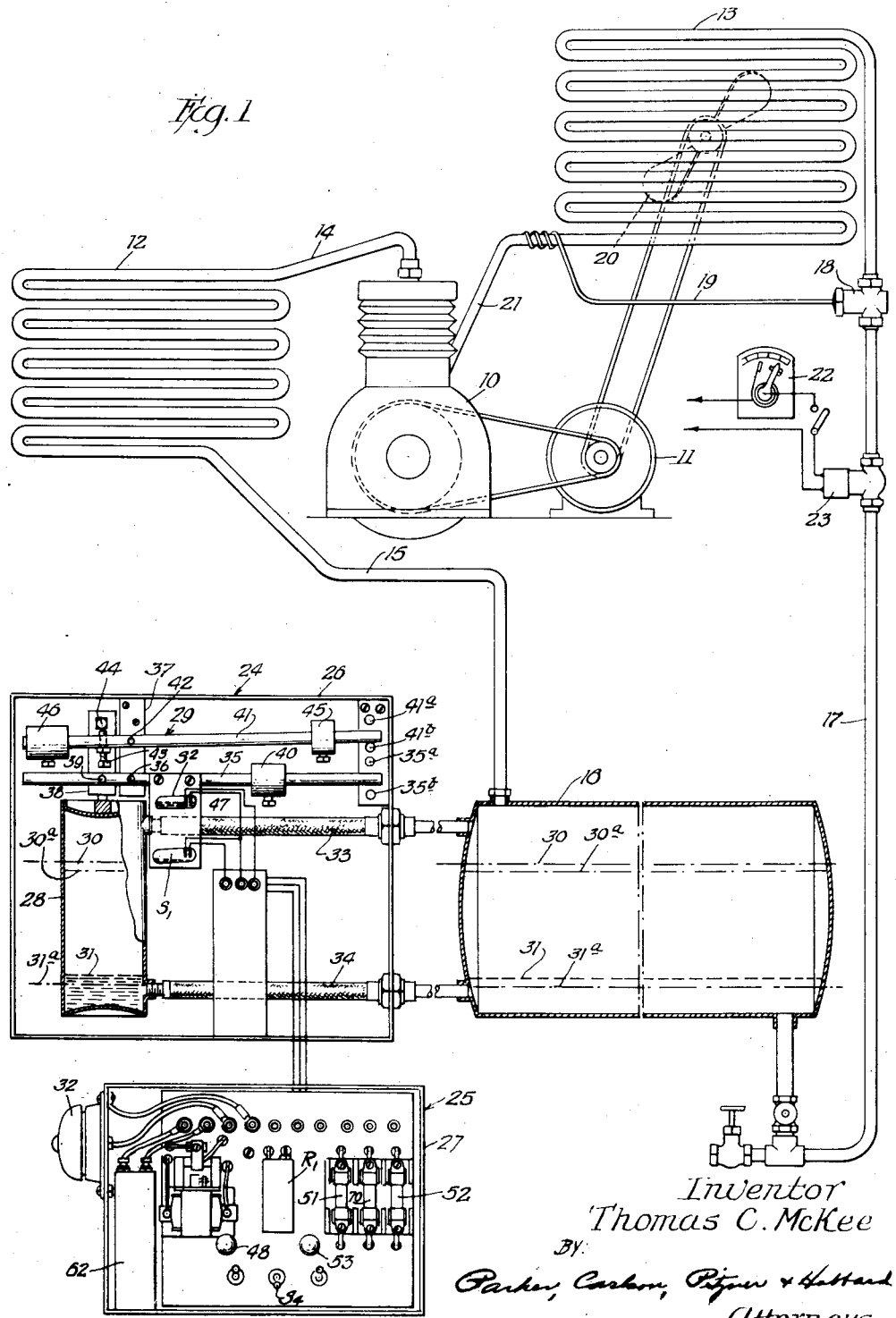

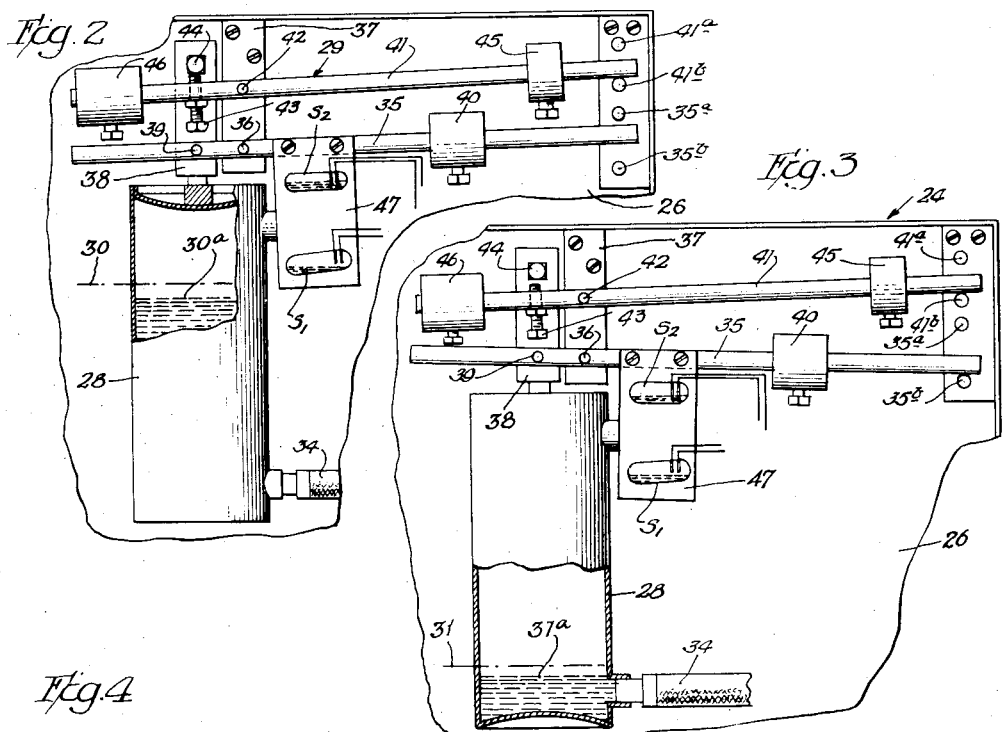
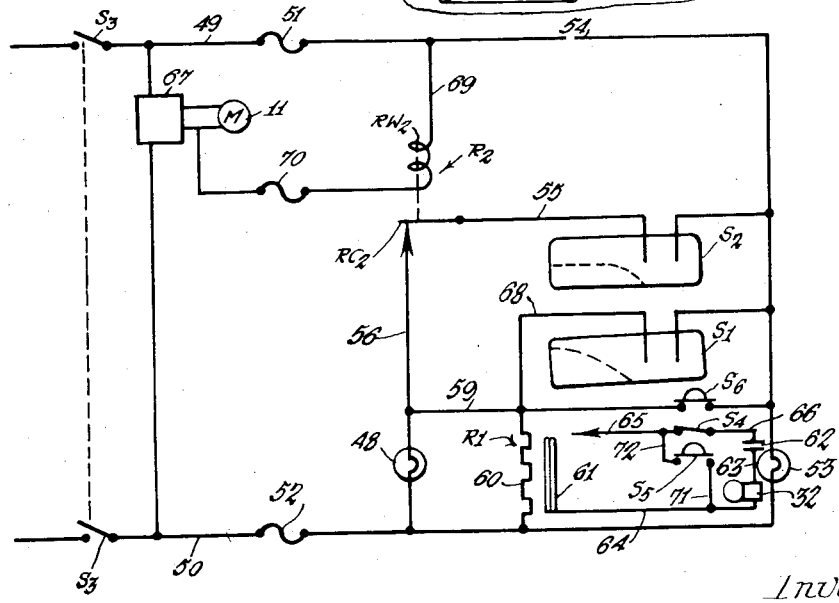

2,160,276

UNITED STATES PATENT OFFICE 2,160,276

LIQUID LEVEL INDICATOR

Thomas C. McKee, Chicago, Ill.

Application April 29, 1937, Serial No. 139,707

5 Claims. (Cl. 177—311)

The invention relates to liquid level indicators, the apparatus herein contemplated being particularly adapted for use in indicating a loss of a predetermined quantity of refrigerant from a refrigerating system.

One object of the present invention is to provide an improved mechanism for selectively indicating a variation in the level of a body of liquid from any one of a plurality of normal levels. Thus, when applied to a refrigerant receiver having a low normal level when the refrigerating system is operating and a high normal level when the system is stopped, the improved indicating apparatus may be utilized to show a loss in refrigerant causing a fall in the liquid level from either of the normal levels.

The invention also resides in the novel form of linkage mechanism included in the plural level indicating apparatus.

Further objects and advantages of the invention will become apparent as the following description proceeds and the features of novelty which characterize the invention are pointed out with particularity in the claims annexed to and forming a part of this specification.

For a better understanding of the invention, reference may be had to the accompanying drawings in which Figure 1 is a schematic view of a refrigerating system provided with an indicating device embodying the invention.

Figs. 2 and 3 are fragmentary detail views illustrating the positions of various parts of the indicating mechanism shown in Fig. 1 in the course of its operation.

Fig. 4 is a wiring diagram of the electrical control system incorporated in the indicating mechanism.

For purposes of illustration the invention has been shown as applied to a compression-condensation-evaporation refrigerating system such as is used, for example, in air cooling installations for buildings and the like. The refrigerating system shown is conventional in form and includes as its principal elements a compressor 10 driven by an electric motor 11, a condenser 12, and an evaporator 13. Compressed gaseous refrigerant discharged from the compressor 10 passes through a conduit 14 to the air cooled condenser 12 in which the refrigerant is liquefied. This liquid refrigerant drains through a conduit 15 into a suitable receiver 16 from which it passes through a conduit 17 to the dry-type evaporator 13. Admission of refrigerant to the evaporator is controlled by the usual expansion valve 18 actuated through fluid in a capillary tube 19 contacting the outlet of the evaporator. Forced circulation of air over the surface of the evaporator is had by a fan 20 and the refrigerant vaporized within the evaporator is returned to the compressor 10 through a conduit 21. A thermostat switch 22 located in the space to be cooled serves to actuate a solenoid valve 23 which controls the flow of refrigerant through the conduit 17 to the evaporator.

In accordance with the present invention, a liquid level indicating means is provided for indicating certain variations in the level of the liquid refrigerant in one of the liquid chambers of the refrigerating system, in the present instance, the receiver 16. The preferred form of liquid level indicating mechanism illustrated includes two units 24 and 25 enclosed in separate sheet metal casings 26 and 27, respectively. The unit 24 embodies in general a liquid sampling container or vessel 28, in which liquid is maintained at the same level as in the receiver 16, and a linkage mechanism designated generally by the numeral 29 which serves to counterbalance the container 28 when the liquid level therein is at either of two selected levels corresponding to the liquid levels in the receiver when the system is respectively in operation and stopped. Thus, when the refrigerating system is not in operation a large volume of liquid refrigerant drains into the receiver 16 filling the same to a normal high level indicated by the dot-dash line 30 and on the other hand, when the system is operating, refrigerant is withdrawn from the receiver, thus lowering the level of the liquid therein to a second or lower normal level indicated by the dot-dash line 31. In the event that any refrigerant leaks from the system, the consequent diminution in the liquid within the receiver from the levels 30 or 31 will cause a condition of unbalance between the sampling container 28 and linkage mechanism 29, thereby completing an alarm circuit through one of the switches S₁ or S₂ which control an alarm mechanism in the unit 25, illustrated in the form of an electric bell 32.

As a means of maintaining a liquid level in the container 28 substantially equal to that prevailing in the receiver 16, a pair of flexible conduits 33 and 34 are provided. These conduits communicate respectively with the upper and lower portions of the receiver 16 as well as of the container 28, thus permitting a free flow of gaseous and liquid refrigerant therebetween. The container 28 as illustrated is generally cylindrical in form and the unit 24 is preferably mounted adjacent the refrigerant receiver or other liquid chamber with the bottom of the container 28 substantially in alinement with the bottom of the liquid chamber. Thus, as the liquid level varies in the receiver 16, the same variation is had in the level within the container 28 and consequently, of the weight of the liquid in the container. The mechanism illustrated is adapted for use with a large variety of liquids as, for example, such relatively high specific gravity refrigerants as sulphur dioxide or comparatively low specific gravity refrigerants as methyl chloride.

The linkage mechanism 29 is adapted in general to counterbalance the container 28 when the liquid therein is at either of its normal levels 30 or 31. This linkage includes a generally horizontal bar 35 pivoted intermediate its ends at 36 on a fixed bracket 37. A support for the container is formed on one end portion of the bar 35 by a vertically disposed link 38 pivoted on the bar at 39. A weight 40 slidably mounted on the opposite end portion of the bar 35 serves to counterbalance the weight of the container and liquid therein when the refrigerating machine is running, that is, when the liquid is at the lower level 31. It will be noted that the position of the weight 40 may be shifted along the length of the bar 35 in order to adjust the mechanism for proper balancing for the particular installation. Movement of the bar 35 is limited by a pair of stops 35a and 35b. An additional balance bar 41 is provided for counterbalancing the container 28 when the liquid level therein is at its higher point 30. This second bar 41 is also pivoted intermediate its ends on the bracket 37 at 42. An adjustable screw or pin 43 on the second balance bar 41 is engaged by a stop 44 on the link 38 when the liquid is at the upper level 30. In this position the container is counterbalanced by a weight 45 adjustably mounted on the opposite end portion of the balance bar 41. A second weight 46 may also be provided on the bar 41 to facilitate further balancing adjustment and the movement of the bar is limited by a pair of stops 41a and 41b. Actuation of the alarm circuit controlling switches S1 and S2 is had by movement of the container 28 from its two counterbalanced positions. These switches have been illustrated in the form of mercury switches adapted for closure upon tilting thereof and are mounted on a panel 47 secured to the lower balance bar 35. As shown in Fig. 1, the container 28 is counterbalanced by the weight 40 on the lower balance bar 35 when the liquid level is at 31, this being the proper level when the associated refrigerating system is in operation with a full charge of refrigerant. In such case, the lower balance bar 35 is substantially horizontal, being midway between the stops 35a and 35b and the upper balance bar 41 rests on the lower stop 41b with the pin 43 out of engagement with the stop 44. The switch S1 is open and the switch S2 is closed. This latter switch S2 is, however, rendered inoperative, in a manner hereinafter described, to actuate the alarm system when the refrigerating machine is running. In the event that some predetermined amount of liquid, ordinarily about ten pounds, is lost from the system, the liquid level falls to 31a, thus causing the weight 40 to overbalance the container 28 and tilt the bar 35 in a clockwise direction (as viewed in Fig. 1) which results in a closure of the alarm circuit switch S1 (Fig. 3). Similarly, when the associated refrigerating system is not in operation, the liquid level is normally at 30 and the container 28 is counterbalanced by the weights 40 and 45 in such manner that the upper balance bar 41 is in a substantially horizontal position midway between the stops 41a and 41b. Loss of a predetermined amount of liquid from the system causes the liquid level to drop to 30a in which case the weight 45 overbalances the container 28, thereby causing closure of the switch S2 which controls the alarm circuit when the refrigerating apparatus is not in operation. It will thus be seen that the double balancing mechanism described makes it possible to utilize a single sampling container for actuating an alarm mechanism in the event of variations from a plurality of normal liquid levels.

The alarm mechanism in the unit 25 preferably includes one device such as a visual indicator or red lamp 48 for instantaneously signaling a predetermined drop in the liquid level, as well as an audible alarm such as the bell 32 which is actuated through a time delay relay R1 if the change in liquid level is sustained for a predetermined interval of time. Operation of the control circuits will best be understood from Fig. 4. Current is supplied to the control circuits from main supply lines 49—50, controlled by a main switch S3, through suitable protective fuses 51 and 52. Closure of the main switch S3 energizes a normal operation indicator illustrated in the form of an amber lamp 53 through a circuit 49—51—54—53—52—50. The high level switch S2 is cut in circuit by a normally closed relay R2 having an actuating winding RW2, energized from the circuit of the compressor motor 11, and normally closed contacts RC2. In the event that the switch S2 is closed due to the liquid level in the container 28 falling below its normal high level 30, the visual signal lamp 48 is energized through a circuit 49—51—54—S2—55—RC2—56—48—52—50. This circuit also energizes a heater element 60 of the time delay relay R1 which is connected in shunt with the lamp 48. A flow of current through this relay heater element sustained for a predetermined interval of time by continued closure of the switch S2 warps the thermostatic relay element 61 to its closed position. Upon closure of the relay element 61, the audible signal or electric bell 32 is actuated from a battery 62 through a circuit 63—32—64—61—65—S4—66. The operator is thus apprised at once of even a momentary fall in the liquid level by the signal lamp 48 and a sustained low level clearly indicative of loss of refrigerant causes the alarm bell 32 to be sounded. This alarm bell may be shut off by opening the normally closed testing switch S4.

Starting of the compressor motor 11 serves to actuate the relay R2 to render the high level switch S2 inoperative to control the alarm circuit. Thus, actuation of the motor starter 67 not only starts the compressor motor 11 but also energizes the relay actuating winding RW2 through a circuit 50—67—70—RW2—69—54—51—49. This circuit is further protected by a fuse 70. Such actuation of the relay R2 opens its contacts RC2, thereby disconnecting the switch S2. In the subsequent operation of the refrigerating machine, if the liquid level falls below its normal low level 31, the low level switch S1 is closed, thereby energizing the signal lamp 48 through a circuit 49—51—54—S1—68—59—48—52—50. At the same time, the time delay heater 60 is energized and as described above, serves to cause the bell 32 to ring if the switch S1 remains closed for a predetermined interval of time. As soon as the refrigerating system is stopped, the relay $R_2$ again closes, thus returning the high level switch $S_2$ to control of the alarm circuit.

An additional pair of testing switches $S_5$ and $S_6$ is preferably provided for periodic testing of the elements of the control circuit. Thus, the bell 32 and battery 62 may be tested by closure of the switch $S_5$ which completes a circuit 63—32—64—71—$S_5$—72—65—$S_4$—66—62. Similarly, the operation of the time relay $R_1$ may be tested by closure of the switch $S_6$, thereby energizing the relay heater 60 through a circuit 49—51—54—$S_6$—59—60—52—50.

Although a particular embodiment of the invention has been shown and described in some detail in connection with a refrigerating system for purposes of illustration, there is no intention to thereby limit the invention to such embodiment but, on the other hand, the appended claims are intended to cover all modifications within the spirit and scope of the invention.

I claim as my invention:

1. In a mechanism for indicating a depletion in the charge of liquid refrigerant in a receiver or other liquid chamber of a refrigerating system having one normal liquid level when the system is in operation and a second normal liquid level when the system is not in operation, the combination of, a movably mounted liquid sampling container, means for maintaining liquid refrigerant in said container at a level corresponding to the level of the liquid refrigerant in the receiver, means for counterbalancing said container when the liquid level therein is at either of two predetermined levels corresponding to the operative and inoperative conditions of the associated refrigerating system, an alarm mechanism having an electrical energizing circuit, control means including a pair of switches sequentially actuated by movement of said container from its two corresponding balanced positions for alternatively completing said alarm mechanism energizing circuit, and means responsive to the operation and non-operation of the associated refrigerating system for alternatively rendering one of said switches operative and the other inoperative to complete said circuit upon a fall in the liquid level in the container from the selected normal level corresponding to the prevailing operating condition of the associated refrigerating mechanism.

2. In a mechanism for indicating a depletion in the charge of liquid refrigerant in a receiver or other liquid chamber of a refrigerating system, the combination of, a movably supported liquid sampling container, means for maintaining liquid refrigerant in said container at a level corresponding to the level of the liquid refrigerant in the receiver, means for counterbalancing said container when the liquid level therein is at either of two predetermined levels corresponding to the operative and inoperative conditions of the associated refrigerating system, an alarm mechanism, control means actuated by movement of said container from either of its two balanced positions due to a diminution of the liquid therein for operating said alarm mechanism, and means responsive to the operation of the associated refrigerating system for rendering said control means inoperative to initiate operation of said alarm mechanism except upon a change of the liquid level in the container from the normal level corresponding to the prevailing operating condition of the associated refrigerating mechanism.

3. In a mechanism for indicating a depletion of the charge of liquid refrigerant in a receiver or other liquid chamber of a refrigerating system having two normal levels therein corresponding to the operative and inoperative conditions of the system, the combination of, means for indicating a predetermined change in the level of a body of refrigerant from the normal level of the liquid when the associated refrigerating system is not in operation, means for indicating a predetermined change in the level of the body of refrigerant from a second normal level of the liquid when the associated system is in operation, and means for alternatively rendering one of said first-named means operative in response to the operation and nonoperation of the associated refrigerating system.

4. In a system having a plurality of normal liquid levels dependent upon the operating condition of an associated mechanism, the combination of, a plurality of means adapted to be actuated in response to a change in the level of a body of liquid from any one of a corresponding plurality of selected levels, and means for selectively rendering individual ones of said first-named means operative and inoperative in response to the operating condition of the associated mechanism.

5. In an apparatus for indicating a depletion of the charge of liquid refrigerant in a receiver or other liquid chamber of a refrigerating system having two normal liquid levels corresponding to the operative and inoperative conditions of the system, an alarm mechanism having an electric energizing circuit, means including two switches forming alternative circuits for completing said alarm circuit, liquid level responsive means for closing one of said switches when the liquid level in the receiver falls below one normal value and for closing the other of said switches when the liquid level falls below the other normal value, and means responsive to the operation and nonoperation of the associated refrigerating system for alternatively rendering said switches operable to complete said alarm circuit.

THOMAS C. McKEE.